United States Patent Office 3,156,703
Patented Nov. 10, 1964

3,156,703
STABILIZED 3,4-DIHYDRO-1,2-PYRAN-2-CARBOXALDEHYDE COMPOSITIONS
Glen D. Lichtenwalter, La Porte, and Gregor H. Riesser and Robert W. Fourie, Pasadena, Tex., assignors to Shell Oil Company, New York, N.Y., a corporation of Delaware
No Drawing. Filed Sept. 30, 1963, Ser. No. 312,294
14 Claims. (Cl. 260—345.9)

This invention relates to an improved method for stabilizing 3,4-dihydro-1,2-pyran-2-carboxaldehyde against polymerization. It also deals with novel stabilized compositions containing this compound which is usually sold under the name acrolein dimer—and will be so referred to, for the sake of brevity, in the following specification. Acrolein dimer resistant to loss during transportation and storage is an important feature of the invention.

Unlike the methacrolein dimer (3,4-dihydro-2,5-dimethyl-1,2-pyran - 2 - carboxaldehyde), crotonaldehyde dimer (3,4 - dihydro - 3,4 - dimethyl - 1,3-pyran-2-carboxaldehydes) and like substituted dihydropyran-2-carboxaldehydes which are relatively stable under ordinary conditions of storage, shipment, and use, acrolein dimer tends to form undesirable polymers under such circumstances. The bulk of the polymer so formed can be readily depolymerized to acrolein dimer by heating under controlled conditions, but this extra treatment adds to the cost of use of the dimer and the formation of the polymer, especially the solid form, causes difficulties in handling which are not encountered with the simple acrolein dimer. A part of the polymer formed cannot be reconverted to acrolein dimer in this way. It is apparently formed by a different reaction mechanism and results in a significant loss of acrolein dimer, further increasing the expense in use of the dimer.

A number of different methods have been suggested for retarding the polymerization of acrolein dimer during storage, transportation, and use. Phenolic antioxidants are widely used but are only partly effective and cannot prevent the gradual increase in viscosity and eventual conversion to solid polymer which takes place under normal conditions of storage of acrolein dimer. Iron oxide is suggested as a stabilizer in Guest-Kiff Patent, U.S. 2,800,488. Fountain-Sharp Patent, U.S. 2,537,579 claims a better method of retarding the acrolein dimer polymerization which takes place even in the presence of phenolic antioxidants. Small amounts of acidic materials are used as the stabilizers in the claimed method. Tannic acid is an excellent stabilizer of this type whose used is claimed in Whetstone Patent, U.S. 2,514,668. U.S. Patent 3,062,838 of Johnson Teague claims stabilization with another type of organic acid which is very effective in preventing polymer formation in acrolein dimer. Although these methods represent a substantial improvement over previous practice, they do not suppress, as completely as would be desirable, all polymerization of acrolein dimer during storage, transportation, and handling. In particular, they do not prevent a significant loss of the acrolein dimer through polymerization to polymer which does not revert to dimer by heating at temperatures up to about the boiling point of the dimer or slightly higher. Formation of this undesirable irreversible polymer is accelerated by the metals commonly used in fabricating containers, and this adds to the problem of storage and shipment of this compound. In our recently issued U.S. Patent 3,084,169, we have described and claimed an especially effective method for avoiding the foregoing difficulties. In the claimed method, acrolein dimer is stabilized as an essentially anhydrous mixture with specified proportions of aliphatic alcohol at a pH of about 4.5 to about 8. While this method is highly advantageous for the suppression of formation of both revertible and irrevertible forms of acrolein dimer polymer, it has the disadvantage of requiring the presence of substantial amounts of alcohol. This adds to the cost of shipment, and in those cases where the acrolein dimer user has no need for the alcohol, it creates a further expense for him in recovery and return of the alcohol to the supplier of the acrolein dimer.

It has now been found that acrolein dimer can be advantageously stabilized by addition of a small amount of a nonacid, and preferably a basic, salt of a metal of group II of the periodic table of the elements. The discovery of the effectiveness of these salts as acrolein dimer stabilizers was most unexpected since, as pointed out above, it has previously been thought that acidic materials were most effective for use in small amounts in suppressing acrolein dimer polymerization. Furthermore, it has long been known that the polymerization of acrolein dimer is catalyzed by a number of basic substances, such, for instance, as sodium, potassium and calcium hydroxides. This is also the case with a number of salts, such, for example, as copper salts, lead chloride, bismuth chloride, tin salts, and the like. The nonacidic salts of the Group II metals, particularly the beryllium, magnesium, and other alkaline earth metals, zinc, cadmium and mercury salts thus appear to be unique stabilizers of acrolein dimer.

It is advantageous to use at least about 0.001%, preferably about 0.01 to about 5% by weight of the nonacidic Group II metal salt or mixture of such salts chosen for stabilizing the acrolein dimer. The salt or salt mixture should preferably be at least partly in solution in the acrolein dimer being stabilized. Any salt of a Group II metal can be employed. Inorganic salts such as the chlorides, sulfates, carbonates, bicarbonates, nitrates, and the like, can be employed as can also organic salts of which the carboxylic acid, sulfonic acid, and like salts are typical. Anhydrous or hydrated salts can be employed. If desired, a small amount of mutual solvent can be used in forming the mixtures of acrolein dimer and stabilizing nonacidic salt. Either polar solvents such as acetone, etc., or nonpolar solvents such as toluene, can be used in this way.

Typical of the results which can be obtained with the new stabilizers of the invention are the following:

Example 1

Acrolein dimer was stored in sealed pyrex containers with and without Group II metal salts. After 127 days of storage under an air atmosphere at outdoor temperature (Houston, Texas), the acrolein dimer was analyzed with results as follows:

| Polymerization Inhibitor | Amount of Inhibitor (wt. percent based on acrolein dimer) | Irreversible Polymer Formed (wt. percent) | Unpolymerized Acrolein Dimer Remaining (wt. percent) |
|---|---|---|---|
| None | None | 1.30 | 83 |
| Anhydrous Magnesium Sulfate ($MgSO_4$) | 0.1 | 0.56 | 95 |
| Barium Chloride dihydrate ($BaCl_2 \cdot 2H_2O$) | 0.1 | 0.38 | 93 |
| Mercurous Chloride ($Hg_2Cl_2$) | 0.1 | .34 | 93 |

The results are the average of two determinations. The Group II metal salts were used in amounts in excess of their solubility in the acrolein dimer under the storage conditions used. Thus, the solubility of magnesium sulfate ($MgSO_4$) as determined by neutron activation on two samples of acrolein dimer stored at Houston, Texas, outdoor temperatures, under air, in steel containers was 0.0011 and 0.0018% w.

Similar good results can be obtained with calcium nitrate $[Ca(NO_2)_2]$ or formate $[Ca(HCO_2)_2]$, strontium chloride $(SrCl_2)$ or zinc phosphate $[Zn_3(PO_4)_2]$ or acetate $[Zn(CH_3CO_2)_2]$.

*Example II*

Acrolein dimer which contained initially 0.22% wt. of material boiling higher than its boiling point was stored in steel drums under air at outdoor temperature without stabilizer in comparison with similarly stored dimer containing magnesium sulfate or tartaric acid as stabilizers. After different periods of storage, the amount of polymer which had formed was determined by measuring the amount of material which boiled higher than acrolein dimer.

The following results were obtained:

| Storage Period | Acrolein Dimer Stability—Material Higher Boiling Than Acrolein Dimer (percent wt.) | | | |
|---|---|---|---|---|
| | One Month | Two Months | Four Months | Six Months |
| No Stabilizer | 0.45 | 0.67 | | |
| Tartaric Acid, 0.01% w | 0.70 | 0.50 | 1.2 | 1.2 |
| Magnesium Sulfate, 0.01% w | 0.39 | 0.55 | 0.46 | 0.8 |

*Example III*

Samples of acrolein dimer were stored in steel drums at outdoor (Houston, Texas) temperatures for 1½ years. The following results were obtained with different inhibitors:

| Inhibitor | Inhibitor Added, Percent w. | Material Higher Boiling than Acrolein Dimer, percent w. | Product Appearance |
|---|---|---|---|
| Oxalic Acid | 0.01 | 27.9 | Viscous. |
| 1,2-diaminocyclohexane tetra-acetic acid | 0.01 | Dimer solidified | Solid. |
| Magnesium Sulfate | 0.01 | 6.8 | Light color. |

Acrolein dimer containing sufficient inorganic barium salt, particularly chloride, to reduce polymer formation during storage are further examples of the stabilized compositions of the invention.

While the advantages in using Group II metal salts as stabilizers for acrolein dimer during storage at ambient temperatures have been emphasized in the foregoing examples because of the commercial importance of this application of the new method, the invention is not limited thereto but can be employed with advantage to stabilize acrolein dimer during reaction, distillation, or other treatment at ordinary or elevated temperatures. It will thus be seen that the invention has many modifications and is not to be limited to those which have been given by way of example and illustration only.

We claim as our invention:

1. A stabilized composition consisting essentially of acrolein dimer and sufficient nonacidic simple salt of metal of Group II of the Periodic Table of the Elements having an atomic number of 4 to 80 to reduce polymer formation during storage.

2. A stabilized composition consisting essentially of acrolein dimer and sufficient nonacidic simple salt of a metal of Group IIB of the Periodic Table of the Elements having an atomic number of 4 to 80 to reduce polymer formation during storage.

3. A stabilized composition consisting essentially of acrolein dimer and sufficient nonacidic simple magnesium salt to reduce polymer formation during storage.

4. A stabilized composition consisting essentially of acrolein dimer and sufficient nonacidic simple magnesium salt of anion of the group consisting of chloride, sulfate, carbonate, bicarbonate, nitrate, phosphate, formate, and acetate to reduce polymer formation during storage.

5. A stabilized composition consisting essentially of acrolein dimer and sufficient nonacidic simple calcium salt of anion of the group consisting of chloride, sulfate, carbonate, bicarbonate, nitrate, phosphate, formate, and acetate to reduce polymer formation during storage.

6. A stabilized composition consisting essentially of acrolein dimer and sufficient nonacidic simple zinc salt of anion of the group consisting of chloride, sulfate, carbonate, bicarbonate, nitrate, phosphate, formate, and acetate, to reduce polymer formation during storage.

7. A stabilized composition consisting essentially of acrolein dimer and sufficient nonacidic simple strontium salt of anion of the group consisting of chloride, sulfate, carbonate, bicarbonate, nitrate, phosphate, formate, and acetate to reduce polymer formation during storage.

8. A stabilized composition consisting essentially of acrolein dimer and sufficient nonacidic simple cadmium salt of anion of the group consisting of chloride, sulfate, carbonate, bicarbonate, nitrate, phosphate, formate, and acetate to reduce polymer formation during storage.

9. A stabilized composition consisting essentially of acrolein dimer and sufficient nonacidic simple beryllium salt of anion of the group consisting of chloride, sulfate, carbonate, bicarbonate, nitrate, phosphate, formate, and acetate, to reduce polymer formation during storage.

10. A stabilized composition consisting essentially of acrolein dimer and sufficient nonacidic simple barium salt of anion of the group consisting of chloride, sulfate, carbonate, bicarbonate, nitrate, phosphate, formate, and acetate, to reduce polymer formation during storage.

11. A stabilized composition consisting essentially of acrolein dimer and sufficient nonacidic simple mercury salt of anion of the group consisting of chloride, sulfate, carbonate, bicarbonate, nitrate, phosphate, formate, and acetate to reduce polymer formation during storage.

12. A stabilized composition consisting essentially of acrolein dimer and sufficient magnesium sulfate to reduce polymer formation during storage.

13. A stabilized composition consisting essentially of acrolein dimer and sufficient barium chloride to reduce polymer formation during storage.

14. A stabilized composition consisting essentially of acrolein dimer and sufficient mercurous chloride to reduce polymer formation during storage.

No references cited.